United States Patent [19]

Landis

[11] Patent Number: 5,160,266
[45] Date of Patent: Nov. 3, 1992

[54] MIX AND MATCH INVISIBLE INK GAME

[75] Inventor: Thomas J. Landis, New Albany, Ind.

[73] Assignee: Stry-Lenkoff Company, Louisville, Ky.

[21] Appl. No.: 653,729

[22] Filed: Feb. 11, 1991

[51] Int. Cl.$^5$ ............................................. G09B 3/02
[52] U.S. Cl. .................................................. 434/328
[58] Field of Search .................... 434/328, 167, 154

[56] References Cited

U.S. PATENT DOCUMENTS

| | | |
|---|---|---|
| 3,516,177 | 6/1970 | Skinner . |
| 3,701,205 | 10/1972 | Wolf ................................. 434/328 |
| 3,826,499 | 7/1974 | Lenkoff . |
| 3,990,156 | 11/1976 | Eigen ................................ 434/328 |
| 4,084,322 | 4/1978 | Waloszyk et al. ................. 434/328 |
| 4,337,051 | 6/1982 | Donlon ............................. 434/328 |
| 4,514,177 | 4/1985 | Lenkoff ............................ 434/328 |

OTHER PUBLICATIONS

Captains Outrageous, Feb. 1976.
Animal Riddles, Sep. 1976.
Sport-Iculous, Jun. 1976.
Pictorial Personalities, Dec. 1980.
Spelling Bee, Dec. 1980.

*Primary Examiner*—Richard J. Apley
*Assistant Examiner*—Glenn E. Richman

[57] ABSTRACT

A learning association game wherein at least two series of images are visibly presented on at least one marking sheet with each of the images of one series being logically related to one of the images of the other series and with the images of each series being in different order to be selectively identified by a responding player with a marking instrument to visibly indicate indicia associated with at least one series of images, the game having a confirmation area associated therewith which includes the visible indicia and the correct invisible answers to be developed with the marking instrument.

18 Claims, 4 Drawing Sheets

WONDERFUL WORLD OF WORDS – SHEET A

Complete the definition on the left by choosing a word on the right. Use your YES and KNOW pen to write the letter of the word you choose in the block. After you have completed all the definitions, rub the space at the bottom of the page to reveal the answers. If two players are involved use your YES and KNOW pen to indicate the sheet the marking party is to use.

1. Parasite ☐    A. Ka
2. Fraud or lie ☐    B. Alaska
3. Strong alcoholic liquor of Mexico. ☐    C. Buccaneer
4. Guarding against attack ☐    D. Tattoo
5. Became a U.S. state in 1959 ☐    E. Poet
6. In ancient Egyptian religion, the soul ☐    F. Discord
7. Food and game fish of the mackeral family ☐    G. Weave
8. To make fabric on a loom ☐    H. Tuna
9. One who writes poems or verses ☐    I. Hanger-on
10. Pirate ☐    J. Tequila
11. Permanent design made on the skin ☐    K. Defense
12. Conflict ☐    L. Deceit

MARKING PARTY ELECTS SHEET ☐

ANSWERS: Rub the space below to see how many you got right.

1-I : 2-L : 3-J : 4-K : 5-B : 6-A : 7-H : 8-G : 9-E : 10-C : 11-D : 12-F

SCORE CORRECT NUMBER ☐

FIG. 1

WACKY WORLD OF WORDS – SHEET B

Complete the WACKYNITION on the left by choosing a word on the right. Use your YES and KNOW pen to write the letter of the word you choose in the block. After you have completed all the WACKYNITIONS, rub the space at the bottom of the page to reveal the answers. Then go to the next page and see how many real definitions you can match with these same words.

1. Don't use that string, use ☐    A. Ka

2. To hang the <u>Mona Lisa</u>, you need a nail to ☐    B. Alaska

3. If you don't like it here ☐    C. Buccaneer

4. What we park in the garage ☐    D. Tattoo

5. Why the hunter shot the lioness ☐    E. Poet

6. I don't know what she likes but ☐    F. Discord

7. Price of fresh corn ☐    G. Weave

8. Millie's not the only one who can make lace Willie can ☐    H. Tuna

9. The theater was so dark I couldn't find ☐    I. Hanger-on

10. When the piano sounds off-key call the ☐    J. Tequila

11. What you do with a pitcher of water ☐    K. Defense

12. The gate was locked so he climbed ☐    L. Deceit

ANSWERS: Rub the space below to see how many you got right.

1-F : 2-I : 3-G : 4-A : 5-J : 6-B : 7-C : 8-D : 9-L : 10-H : 11-E : 12-K

SCORE CORRECT NUMBER ☐

FIG. 2

GEOMETRIC WORDS

Complete the definition on the left by choosing a figure on the right. Use your YES and KNOW pen to write the letter of the figure you choose in the block. After you have completed all the definitions rub the space at the bottom of the page to reveal the answers.

1. Ellipse         ☐ A. 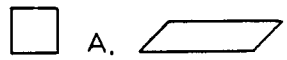

2. Circle          ☐ B. 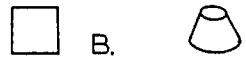

3. Cube            ☐ C. 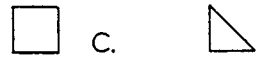

4. Parallelogram   ☐ D. 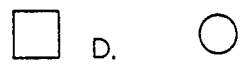

5. Frustum         ☐ E. 

6. Cylinder        ☐ F. 

7. Square          ☐ G. 

8. Rectangle       ☐ H. 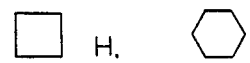

9. Right Triangle  ☐ I. 

10. Hexagon        ☐ J. 

11. Equilateral Triangle  ☐ K. 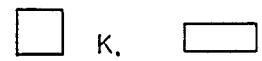

12. Octagon        ☐ L. 

ANSWERS: Rub the space below to see how many you got right.

1-L:2-D:3-I:4-A:5-B:6-J:7-E:8-K:9-C:10-H:11-G:12-F

SCORE CORRECT NUMBER ☐

FIG. 3

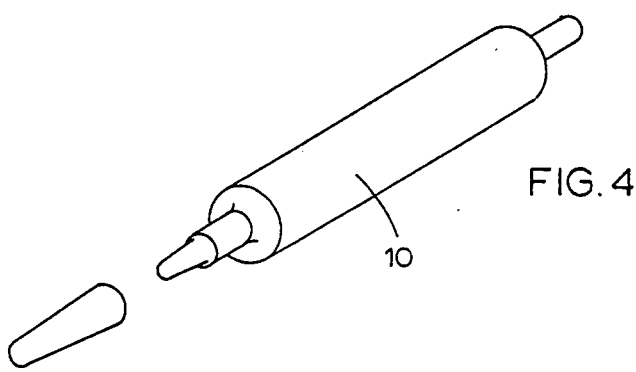

FIG. 4

When two party players are involved, one marking party elects column and completes column elected. The other party completes the non-elected column. Use the YES and KNOW pen to write the letter of the word elected in the column of your choice. After completing all the definitions, rub the space at the bottom of the page to reveal the answers.

WONDERFUL WORDS
I

1. Parasite
2. Fraud or lie
3. Strong alcoholic liquor of Mexico
4. Guarding against attack
5. Became a U.S. state in 1959
6. In ancient Egyptian religion, the soul
7. Food and game fish of the mackeral family
8. To make fabric on a loom
9. One who writes poems or verses
10. Pirate
11. Permanent design made on the skin
12. Conflict

WACKY WORDS
II

1. Don't use that string, use ___
2. To hang the Mona Lisa, you need a nail to ___
3. If you don't like it here ___
4. What we park in the garage ___
5. Why the hunter shot the lioness ___
6. I don't know what she likes but ___
7. Price of fresh corn ___
8. Millie's not the only one who can make lace Willie can ___
9. The theater was so dark I couldn't find ___
10. When the piano sounds off-key call the ___
11. What you do with a pitcher of water ___
12. The gate was locked so he climbed ___

Marking Party Elected Column
| | I | II | |
|---|---|---|---|
| A. | ☐ | ☐ | Ka |
| B. | ☐ | ☐ | Alaska |
| C. | ☐ | ☐ | Buccaneer |
| D. | ☐ | ☐ | Tattoo |
| E. | ☐ | ☐ | Poet |
| F. | ☐ | ☐ | Discord |
| G. | ☐ | ☐ | Weave |
| H. | ☐ | ☐ | Tuna |
| I. | ☐ | ☐ | Hanger-on |
| J. | ☐ | ☐ | Tequila |
| K. | ☐ | ☐ | Defense |
| L. | ☐ | ☐ | Deceit |

ANSWERS: Rub the space below of the elected column I or II to see how many you got right.

Score Correct Number
I ☐  II ☐

MIX AND MATCH INVISIBLE INK GAME

BACKGROUND OF THE INVENTION

The present invention relates to a novel game assembly and more particularly to a novel game assembly utilizing an invisible ink marking instrument to facilitate the learning of image concepts expressed in various associated series forms—including words, symbols and graphics with the invisible marking instrument serving to provide visible answers and to produce visible answer confirmations from invisible verifications.

It is generally known to utilize invisible ink in learning devices such as is disclosed in U.S. Pat. No. 3,516,177, issued to B. F. Skinner on Jun. 23, 1970. It also is generally known to utilize invisible ink in game devices such as disclosed in U.S. Pat. No. 3,826,499, issued to Leon G. Lenkoff on Jul. 30, 1974. In fact, combined invisible ink learning and game devices have been published which broadly utilize a first visible series of words and/or phrases and a second visible series of logically associated words and/or phrases, each of said second visible series having several selectable visible identifying indicia separate from said first series in an area immediately adjacent there to be marked with a chemical marking instrument to cause an invisibly marked "Yes" or "No" associated therewith to be developed by such marking instrument produce a confirming "Yes" or a disconfirming "No" as to the answer selected. In this regard, attention is directed to the learning games entitled "CAPTAINS OUTRAGEOUS," published by Stry-Lenkoff Company on Sep. 2, 1976 and to "SPELLING BEE," published by Stry-Lenkoff Company on Dec. 31, 1980. Attention is further directed to the Stry-Lenkoff Company's invisible ink type games "ANIMAL RIDDLES", published on Sep. 2, 1976 and "SPORT-ICULOUS," published on Jun. 8, 1976 both of these latter invisible ink games employing the use of word puns in the playing thereof. Finally, attention is directed to the Stry-Lenkoff Company invisible ink games "PICTORIAL PERSONALITIES," published by Stry-Lenkoff Company on Dec. 31, 1980 which teaches the use of pictures and words in the playing thereof.

None of these aforedescribed games, however, teaches the unique concept of two or more series of visibly presented images, each of one series being logically related to one of the other series and in different column order to be selectively identified during one marking sequence with a marking instrument and then confirmed, preferably during another marking sequence with the same instrument by developing invisible confirming marks. With such an inventive arrangement, it is possible to provide several series of chronologically varied image concepts, alternatively presented to one or more player in the form of words and definitions, words and puns thereon, words and pictorial images, words and synonyms words and antonyms and words and homonyms. These various novel arrangements allow for a number of similar games to be played by one or more participants with responses of each party readily confirmed on the same playing sheet of the playing party and then scored. Further, such an arrangement can be complimented with an initial random selection of games through the development with a marking instrument of an invisibly marked area by one player. The games, in accordance with the present invention, can provide educational learning drills, approaching word concepts and understanding not only through a novel and enjoyable exercise and game which provides direct understanding of similarities and differences in words but also through the use accompanying pictorial images and the humorous play on words—as well as through the use of homonyms, antonyms and similes with identical and/or different base series. Furthermore, the novel learning game form of the present invention lends itself to a book assembly of several sheets to provide a compact, readily assembled book of sheets, each to be used with a suitable marking device so as to provide one or more players with a package which not only is capable of imparting a learning drill or drills but, at the same time, which affords many hours of entertainment to the users thereof. Various other features of the present invention will become obvious to one skilled in the art upon reading the disclosure set forth herein.

BRIEF SUMMARY OF THE INVENTION

More particularly the present invention provides a learning association game comprising: at least one marking sheet; a color changing chemical marking means for marking the sheet visibly; a first series of differing visible images marked on the sheet in a first preselected arranged sequence; a second series of differing visible images marked on the sheet, each image thereof logically corresponding to at least one of the first series of differing visible images, the second series of differing visible images being in a second preselected arranged sequence different from the first preselected arranged sequence; visibly marked identifying indicia for each of the differing visible images of at least one of the series of visible images; visibly marked response areas for and adjacent each visible image to allow the visible insertion therein with the marking means that specific identifying indicia for the logically corresponding image of the other series; and, an answer confirmation area visibly outlined on the sheet which sets forth visibly the identifying indicia for each image of the one identified series and invisibly the correct answer associated therewith to be developed by the marking means to verify the correctness of the answers marked in the response areas. Further, the present invention includes an arrangement where the two or more series of images can be words and definitions, can each be pictorial, can be words and pictorial images, can be words which are synonyms of each other, can be words which are homonyms of each other, can be words which are antonyms of each other and even can be historical dates and the events or principal person associated therewith.

It is to be understood that various changes can be made by one skilled in the art in one or more of the several parts of the disclosure set forth herein without departing from the scope or spirit of the present invention.

BRIEF DESCRIPTION OF THE DRAWINGS

Referring to the drawings, which disclose one embodiment of the present invention and several modifications thereof:

FIG. 1 is a plan view of a marking sheet incorporating one form of the invention including two series of images, both series being preselectively arranged in the form of words, with the words of each series being arranged in differing logical order, one series on the right being a list of words and the other on the left being a list of the definitions with a response area therebetween to be visibly marked and with an answer confirmation block including visible identifying indicia and invisibly marked correct answers set forth at the bottom of the sheet. The sheet is referred to as "SHEET A" and includes an invisibly marked visible sheet selection block and a visible scoring block to be marked visibly;

FIG. 2 is a plan view of a marking sheet similar to that of FIG. 1, incorporating a modified form of the invention including two series of images, both series also being in the form of words with the words of each series being arranged in differing logical order, one series on the right being a list of words as in FIG. 1 and the other on the left a list of incomplete puns requiring a word on the right to complete or "plays on such words" of the first series with a response area therebetween to be marked visibly and with the answer confirmation block including visible identifying indicia and correct invisibly marked answers set forth at the bottom of the sheet. The sheet is referred to as "SHEET B" and also includes a visibly marked scoring block to be marked visibly;

FIG. 3 is a plan view of a reduced marking sheet similar to that of FIG. 1, incorporating a further modified form of the invention including two series of images, one series on the left being in the form of words and the other series on the right being in the form of pictorial representations of the words in the first series arranged in differing logical order with appropriate response areas and identifying indicia as in FIGS. 1 and 2 and with an answer confirmation block with visibly marked identifying indicia and correct invisibly identifying marked answers set forth at the bottom of the sheet and a visibly marked scoring block to be marked visibly;

FIG. 4 is an isometric view of a color changing marking instrument in the form of a pen and cap which can be used with the sheets of FIGS. 1-3 and 5; and FIG. 5 is a plan view of a marking sheet including three series of differing images incorporating the series of differing images of FIGS. 1 and 2 on a single sheet.

DETAILED DESCRIPTION OF THE DRAWINGS

Referring to FIGS. 1 and 2 of the drawings, two sheets 2 and 3 are disclosed, each including two vertical columns 4 and 6 and 7 and 8 respectively of differing visible images marked on each sheet as a series of words. On sheet 2, column 4 comprises a first series of differing visible images in the form of word definitions arranged in a first preselected sequence, each definition including a visible identifying indicia associated therewith which visible identifying indicia advantageously can be a series of chronological numbers arranged sequentially in accordance with the number of definitions in column 4. Adjacent column 6 comprises a second series of differing visible images logically corresponding to the visible images of column 4 in the form of words to be defined, these second series of differing visible images in the form of words to be defined are arranged in a different preselected sequence from the preselected sequence of the first series of definitions of column 4. Each word of column 6 also includes a visible identifying indicia associated therewith which visible identifying indicia advantageously can be a series of alphabetic letters which are arranged sequentially in accordance with the number of words to be defined in the definitions column 4. Visibly marked response areas in the form of blocks are provided adjacent each alphabetic letter to allow the selected visible insertion therein with the color changing marking instrument 10 of FIG. 4 that specific identifying indicia believed to be the logically corresponding image of the other series. Since the differing images of each of the series of images in the columns 4 and 6 are adjacent each other with the response area in the form of blocks conveniently between columns it is possible for the marker to use the visible identifying indicia of either column in marking a response of logically associated images or to use the visibly marked identifying indicia of column 4.

It is to be noted that each sheet 2 and 3 of the novel learning association game is provided with a suitable instruction area 9 and 11 respectively and each sheet 2 and 3 is further provided with an answer confirmation area 12 and 13 respectively visibly outlined on the sheet. Each confirmation area 12 and 13 sets forth visibly the identifying indicia for each image of one visibly marked identifying series and invisibly the correct answer from the visible identifying indicia associated with the other series to be developed visibly by a marker with the marking instrument 10 of FIG. 4 to verify the correctness of the answers visibly marked by a player in the response areas or blocks. A score box 14 and 16 respectively is provided adjacent each answer confirmation area 12 and 13 respectively.

It is to be understood that the novel learning association game can be played by a single party or marker as a "BY-YOURSELF ENJOYMENT" ® game or can be played competitively between two or more parties or markers, each using a separate marking sheet. In this regard, it is to be noted that sheets 2 and 3 are each provided with a different visible identifying indicia, such as "SHEET A" and "SHEET B" respectively and that one of the sheets, in this instance, sheet 2, is provided with a marking box 15 having invisibly printed therein the identifying indicia of that sheet elected by the marking party or marker developing the image. It further is to be noted that, the visible series of images in the right hand column 8 of sheet 3 can be in word form identical with the word form of the visible series of images set forth in the right hand column 6 of sheet 2 and that the visible series of adjacent images in column 7 of SHEET B can be incomplete word puns on the words in the identical series of words of columns 6 and 8. Thus, if a novel learning association game is played by two different parties, one party can respond to SHEET A or sheet 2 with definitions of a series of words and the other to SHEET B or sheet 3 with puns on the same series of words. On the other hand, if sheets 2 and 3, marked SHEETS A and B respectively, are playing by the same party, the definitions and puns thereon serve as a learning drill for the marking party. As can be seen in FIG. 5, three series of differing images are shown incorporating the series of differing images disclosed in FIGS. 1 and 2 on a single sheet, with minor changes being made in the wording of top legend 25 and answer area 26, accommodating the use of Roman numerals I and II as indicated.

Referring to FIG. 3, the novel learning game is set forth in still a further modified manner wherein the first or left hand series of differing images on sheet 17, column 18, is disclosed as words used to describe geometric figures and the right hand series of images in column 19 include a series of pictorial representations, each being associated with one of the words of column 18 with the series of the two columns being arranged in logically differing order. As described above for sheets 2 and 3, sheet 17 includes visibly marked indicia for each visible word in the series of words of column 18 and each picture of the series of pictures disclosed in the logically differing pictorial series of column 19. Also suitable response areas or blocks, an instruction block 20, answer confirmation block 21 and a correct number block 22 can be provided—all in a manner like that described for sheets 2 and 3.

It is to be understood that in accordance with the inventive concept as set forth herein for sheets 2, 3 and 17, additional sheets can be provided which could include the concepts of words and antonyms, words and homonyms, words and synonyms, words and similes, dates and images in the form of events or persons, as well as other image series capable of being mixed and matched in accordance with the novel arrangement described.

It is to be understood that any of several chemical formulations of invisible printing inks known in the printing art can be employed in the present invention. For example, the marking sheets can be treated with a suitable acid or base material which remains suitably invisible and the instrument 10 of FIG. 4 can be provided with appropriate color changing chemical materials. The acid or base is conveniently applied in any one of several aqueous solutions. The particular invisible ink formulation used on the marking sheets and writing instrument does not comprise an essential part of the present invention and the present invention is not to be considered as limited to any specific formulation. It is only essential that the invisible figures in the defined block areas remain suitably invisible until marked by a player with an appropriate marking instrument and formulations such as that in U.S. Pat. No. 3826499 and that such instrument also be capable of marking visible responses in the aforedescribed response areas.

Thus, in accordance with the present invention, a novel learning association game is provided which can be played individually with two (2) or more players to provide hours of entertainment and, at the same time, serve as a learning association, drill to develop word skills and vocabulary.

I claim:

1. A learning association game comprising: at least one marking sheet; a color changing chemical marking means for marking said sheet visibly; a first series of differing visible images marked on said sheet each in the form of at least a portion of a positive statement, said series of statements being arranged in a first preselected arranged sequence; a second series of differing visible images marked on said sheet, each image thereof logically corresponding to at least one of substantially the entirety of said first series of differing visible image statements with the quantity of images in said first and second series being substantially equal, said second series of differing visible images being in a second preselected arranged sequence different from said first preselected sequence with each of substantially all images of one of said series being logically related to at least one of substantially all of the other of said series; visibly marked identifying indicia for each of the differing visible images of both of said series of visible images; a single visibly marked response area for each of the differing visible images of one of said series of visible images to allow the insertion therein with said marking means of a specific identifying indicia selected as the logically corresponding image of said other series; and, a separate answer confirmation area visibly outlined on said sheet which sets forth visibly the identifying indicia for each image of said one visible identifying series and invisibly the correct answer from the visible identifying indicia association with the other series to be developed visibly by said marking means to verify the correctness of the answers marked in said response areas.

2. The learning association game of claim 1, one of said first and second visibly marked series of differing images being a series of words and the other of said series each being a definition of one said words.

3. The association game of claim 1, one of said first and second visibly marked series of differing images being a series of words and the other of said series each involving a word pun on one of said words.

4. The learning association game of claim 1, both of said first and second visibly marked series of differing images being pictorial.

5. The learning association game of claim 1, one of said first and second visibly marked series of differing images being a series of words and the other of said series of differing images each being a pictorial image of one of said words.

6. The learning association game of claim 1, wherein said first and second series of images are in adjacent columns with at least a majority of adjacent images of said first and second series of adjacent images in said columns being of differing logical chronology.

7. The learning association game of claim 1, wherein both of said series of images have different identifying indicia visibly marked on said sheet in association with each differing image of said series, said answer verification area setting forth visibly the identifying indicia visibly marked on said sheet for one series of images and invisibly the correct answer of the other series of identifying indicia of said other series to be developed visibly by said marking means to verify correctness of the marked answers in said response areas.

8. The learning association game of claim 1, one of said first and second visibly marked series of differing images being a series of words each of one specific meaning and the other of said series of differing images, each being a word that is an antonym of one word of said other series.

9. The learning association game of claim 1, one of said first and second visibly marked series of differing images being a series of words, each of one specific meaning and the other of said series of differing images, each being a word that is a homonym of one word of said other series.

10. The learning association game of claim 1, one of said first and second visibly marked series of differing images being a series of words, each of one specific meaning and the other of said series of differing images, each being a word that is a synonym of one word of said other series.

11. The learning association game of claim 1, one of said first and second visibly marked series of differing images being a series of dates and the other of said series of differing images, each being an event associated with one date of said other series.

12. The learning association game of claim 1, said first and second visibly marked series of differing images, each being a series of words with each of the images of one series being a simile of one of the images in the other series.

13. The learning association of claim 1 and at least a third series of differing visible images marked on said sheet, each image logically corresponding to at least one of substantially the entirety of said first series of differing images with the quantity of images in said first and third series being substantially equal, said third series of differing visible images being in a third preselected arranged sequence different from said first preselected arranged sequence with each of substantially all images of one of said series being logically related to at least one of substantially all images of the other two series; visibly marked identifying indicia for each of the differing visible images of of said three series of visible images; a single visibly marked response area for each of the differing visible images for each of said second and third series of visible images to allow the insertion therein with said marking means a specific identifying indicia selected as the logically corresponding image of said first series with said identifying indicia associated therewith; and answer confirmation areas for said second and third series visibly outlined on said sheet which sets forth visibly the identifying indicia for each image of said first identified series of images and invisibly the correct answers associated therewith for said second and third series respectively to be developed by said marking means to verify correctness of answers marked in said response areas.

14. The learning association game of claim 13, at least two marking sheets being used with said first and second series of differing images being on one sheet and said first and third series of differing images being on the other sheet.

15. The learning association game of claim 13, one of said first, second and third visibly marked series of differing images being a series of words and one of the other of said other two series each being a definition of one of said words and the third of said series of differing images, each involving a word pun of one of said words.

16. The learning association game of claim 13, one of said first, second and third visibly marked series of differing images being a series of words and one of the other of said series, each being a definition of one of said words and the third of said series of differing images, each being a pictorial representation of one of said words.

17. The learning association game of claim 13, at least two marking sheets being used with said first and second series of differing images being on one sheet, said first and third series of differing images being on the other sheet and said answer confirmation areas being on each sheet respectively for said second and third series of differing images.

18. The learning association game of claim 17, and a designation area invisibly marked with an identification of the sheet to be played by a playing party in a game which can involve two or more playing parties.

* * * * *